(12) United States Patent
Lightstone et al.

(10) Patent No.: US 7,028,022 B1
(45) Date of Patent: Apr. 11, 2006

(54) HEURISTIC-BASED CONDITIONAL DATA INDEXING

(75) Inventors: Sam S. Lightstone, Toronto (CA); Catherine S. McArthur, Uxbridge (CA); William T. O'Connell, Markham (CA); Miroslaw A. Flasza, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 09/627,662

(22) Filed: Jul. 28, 2000

(30) Foreign Application Priority Data

Jul. 29, 1999 (CA) .............................................. 2279119

(51) Int. Cl.
*G06F 17/30* (2006.01)

(52) U.S. Cl. .............................. 707/2; 707/3; 707/102; 707/104.1

(58) Field of Classification Search ............... 707/1–10, 707/102, 104
See application file for complete search history.

(56) References Cited

U.S. PATENT DOCUMENTS

| 4,648,031 | A | | 3/1987 | Jenner |
| 5,095,423 | A | * | 3/1992 | Gramlich et al. ............... 707/8 |
| 5,129,082 | A | * | 7/1992 | Tirfing et al. ................... 707/3 |
| 5,230,047 | A | | 7/1993 | Frey, Jr. et al. |

(Continued)

FOREIGN PATENT DOCUMENTS

| JP | 5066984 | 3/1993 |
| JP | 10011345 | 1/1998 |

OTHER PUBLICATIONS

"Incrememtal Updates of Inverted Lists for text Document Retrieval"—Anthony Tomasic, Hector Garcia–Molina and Kurt Shoen—ACM SIGMOD May 1994, (pps: 289–300).*

"Synthetic Workload performance Analysis of Incremental Updates"—Kurt Shoens, Anthony Tomasic and Hector Garcia–Molina ACM SIGIR Aug. 1994, (pps: 329–338).*

"Dynamic Maintenance of Wed Indexes Using Landmarks"—Lipyeow Lim, Min Wang, Sriram Padmanabhan, Jeffrey Scott Vitte and Ramesh Agarwal–ACM–May 20–24, 2003 (pps: 102–111).*

D.J. Haderle, et al., "Index Utilization Enhancement by Deferring Updates and Retrievals", Research Disclosure, May 1990, p. 14–15.

"Dynamic Ordering of Joined Rows Using Fields from Multiple Tables", IBM Technical Disclosure Bulletin, vol. 36, No. 11, Nov. 1993, pp. 363–366.

(Continued)

*Primary Examiner*—Jean M. Corrielus
*Assistant Examiner*—Anh Ly
(74) *Attorney, Agent, or Firm*—Rabindranath Duttsa; David W. Victor; Konrad Raynes & Victor LLP

(57) ABSTRACT

A computer system for the indexing of data in which a heuristic determination function is applied to predict an efficient index updating approach. The system is able to update an index relating to a first data set by incrementally updating the index or by a rebuild of the index at the completion of the addition of a second set of data to the first set of data. The system applies a heuristic determination function to the characteristics of the first set of data, its index, and the second set of data, to predict whether an incremental update or a rebuild update of the index will result in a more efficient rebuild of the data. The system applies this approach to a restore and rollforward recovery or a data load operation to improve the efficiency of these operations.

39 Claims, 3 Drawing Sheets

U.S. PATENT DOCUMENTS

| | | | |
|---|---|---|---|
| 5,455,946 A | | 10/1995 | Mohan et al. |
| 5,561,795 A | | 10/1996 | Sarkar |
| 5,717,921 A | | 2/1998 | Lomet et al. |
| 5,742,805 A | | 4/1998 | Kulkarni et al. |
| 5,758,356 A | | 5/1998 | Hara et al. |
| 5,764,877 A | | 6/1998 | Lomet et al. |
| 5,918,225 A | * | 6/1999 | White et al. .................. 707/3 |
| 5,924,088 A | * | 7/1999 | Jakobsson et al. ............ 707/2 |
| 6,026,406 A | * | 2/2000 | Huang et al. ............... 707/100 |
| 6,070,158 A | * | 5/2000 | Kirsch et al. .................. 707/3 |
| 6,154,746 A | * | 11/2000 | Berchtold et al. .......... 707/100 |
| 6,278,992 B1 | * | 8/2001 | Curtis et al. .................. 707/3 |
| 6,334,124 B1 | * | 12/2001 | Bouchard et al. ............. 707/3 |
| 6,360,228 B1 | * | 3/2002 | Sundara et al. ................ 707/1 |
| 6,457,017 B1 | * | 9/2002 | Watkins et al. ................ 707/3 |
| 6,553,369 B1 | * | 4/2003 | Guay et al. .................... 707/3 |
| 6,591,269 B1 | * | 7/2003 | Ponnekanti ................ 707/100 |
| 6,622,142 B1 | * | 9/2003 | Murray et al. ............. 707/100 |

OTHER PUBLICATIONS

C. Mohan, "Disk Read–Write Optimizations and Data Integrity in Transaction Systems Using Write–Ahead Logging", IEEE, 1995, pp. 324–331.

K.S. Pang, et al., "An Efficient Recovery Scheme for Large Data in Multimedia DBMS", Journal of the Korea Information Society, vol. 22, No. 2, Feb. 1995, pp. 206–217 (Abstract) p. 6.

J. Andersen, "The New Database Wars", InformationWEEK, No. 611, Dec. 1996, pp. 45–47, 49, 51, 53 (Abstract) p. 7.

S.S. Lee, et al., "An Index Recovery Method For Real–Time DBMS in Client–Server Architecture", IEEE, Mar. 1997, pp. 110–117.

* cited by examiner

HEURISTIC-BASED CONDITIONAL DATA INDEXING

RELATED FOREIGN APPLICATION

This patent application claims priority from the commonly assigned Canadian Patent Application entitled "Heuristic-Based Conditional Data Indexing", having Canadian Patent Application Serial No. 2,279,119, filed on Jul. 29, 1999 by Sam S. Lightstone, Miroslaw A. Flasza; Catherine S. McArthur and William T. O'Connell, which application is incorporated herein by reference in its entirety.

1. Field of the Invention

The present invention is directed to an improvement in computing systems and in particular to computer systems which include the indexing of data.

2. Background of the Art

Computer systems for the storage and retrieval of data typically include indexes of the data which are created to permit operations on the data (data retrieval or updating) to be performed in an efficient manner. Updating such indexes is typically costly in system resources and time. For example, in a relational database environment, appending a new record to a table in the database will require a new entry in any indexes which have been created for that table. The time and computer resources required to add a set of data to the table may be significantly less than the operation of updating the associated indexes.

In database management system (DBMS) environments, it is typically the case that the efficiency or inefficiency of the index updating operations significantly impacts on the efficiency of the database operations as a whole.

It is therefore desirable to have a DBMS computer system which includes features to make more efficient the updating of indexes associated with data stored by the DBMS.

SUMMARY OF THE PREFERRED EMBODIMENTS

According to one aspect of the preferred embodiments, there is provided an improved system for indexing data.

According to another aspect of the preferred embodiments, there is provided an improved method, system, and program for updating an index on a database table when data is added to the table. When data records are received to load into the table, a selection is made of a first operation or second operation. The first operation incrementally updates the index on the table as each record in the received data is added to the table and the second operation rebuilds the index from the table after all the received data records have been added to the table. The selected first or second operation is used to update the index with the received data.

In still further embodiments, a determination is made as to which of the first operation or second operation is more efficient. The first or second operation determined to be more efficient is the selected operation used for updating the index with the received data.

According to another aspect of the preferred embodiments, there is provided a computer system for database management comprising, means for storing and updating a first set of data, indexing means for storing and updating a selected index of key values related to the first set of data, the indexing means comprising means for selectively updating the index by incrementally updating the index by incrementally adding key values to the index or by fully rebuilding the index, heuristic determination means for selecting the incremental update of the index, or the full rebuild of the index, for a given second set of data to be added to the first set of data.

According to another aspect of the preferred embodiments, there is provided the above computer system in which the heuristic determination means comprises a function which takes as input index meta-data, comprising characteristics of the first set of data, the index, and the second set of data.

According to another aspect of the preferred embodiments, there is provided the above computer system in which the database management system is a relational database management system in which the index is stored as a binary tree and in which the index meta-data comprises estimates of the table size of the first set of data, the table size of the second set of data, and the height of the index, whereby the function is empirically defined to select the incremental update of the index or the full rebuild of the index based on the predicted relative efficiencies of the incremental update of the index and the full rebuild of the index.

According to another aspect of the preferred embodiments, there is provided the above computer system in which the function determines, for each potential binary tree height of the index, a threshold percentage of the table size of the second set of data to the table size of the first set of data, whereby the threshold percentage value for each binary tree height determines the selection of the incremental index update or the full rebuild index update.

According to another aspect of the preferred embodiments, there is provided the above computer system in which the heuristic determination means comprises means for the user to specify the selection of the incremental update of the index or the full rebuild of the index.

According to another aspect of the preferred embodiments, there is provided the above computer system further comprising means for generating values for the function of the heuristic determination means, for a specified test range of values for each of the first set of data, the index, and the second set of data.

According to another aspect of the preferred embodiments, there is provided the above computer system, the computer system having one or more CPUs, one or more disks, a sort heap and a database bufferpool, and in which the index meta-data is defined to reflect a subset of the following characteristics: the percentage of free space in the index, the estimated size of the index after both the incremental and the rebuild updates of the index, the width of the average key value in the index, the size of the sort heap and the database bufferpool in the computer system, the number and speed of the CPUs in the computer system, and the number and speed of the disks in the system.

According to another aspect of the preferred embodiments, there is provided a computer system for relational database management comprising, means for storing and updating a first set of data, indexing means for storing as a binary tree, and updating, a selected index of key values related to the first set of data the indexing means comprising means for selectively updating the index by incrementally updating the index by incrementally adding key values to the index or by fully rebuilding the index, heuristic determination means for selecting the incremental update of the index, or the full rebuild of the index, for a given second set of data to be added to the first set of data, the heuristic determination means comprising a function which takes as input index meta-data, the index meta-data being stored separately from the first set of data and comprising estimates of the table size of the first set of data, the table size of the second set of data, and the height of the index, whereby the function is empirically defined to select the incremental update of the index or the full rebuild of the index based on the predicted relative efficiencies of the incremental update of the index and the full rebuild of the index, the heuristic determination means further comprising means for the user to specify the selection of the incremental update of the index or the full rebuild of the index.

According to another aspect of the preferred embodiments, there is provided a computer program product for use with a computer comprising a central processing unit and random access memory, said computer program product comprising a computer usable medium having computer readable code means embodied in said medium for managing a database, said computer program product comprising computer readable program code means for causing a computer to implement the system functionality described above.

According to another aspect of the preferred embodiments, there is provided a method for updating a selected index in a computer system for database management, the computer system comprising means for storing and updating a first set of data related to the index, the method comprising the steps of:

(a) heuristically selecting one of: the incremental update of the index, or the full rebuild of the index, for a given second set of data to be added to the first set of data, and (b) selectively updating the index by incrementally updating the index by incrementally adding key values to the index or by fully rebuilding the index, as selected.

According to another aspect of the preferred embodiments, there is provided the above method in which the step of heuristically selecting the update of the index comprises the evaluation of a function which takes as input index meta-data, comprising characteristics of the first set of data, the index, and the second set of data.

According to another aspect of the preferred embodiments, there is provided a method for updating a selected b-tree index in a computer system for relational database management, the computer system comprising means for storing and updating a first set of data related to the index, the method comprising the steps of:

(a) using a heuristic determination function to select one of: the incremental update of the index, or the full rebuild of the index, for a given second set of data to be added to the first set of data, the heuristic determination function taking as input index meta-data comprising estimates of the table size of the first set of data, the table size of the second set of data, and the height of the index, whereby the heuristic function is empirically defined to select the incremental update of the index or the full rebuild of the index based on the predicted relative efficiencies of the incremental update of the index and the full rebuild of the index, and (b) selectively updating the index by incrementally updating the index by incrementally adding key values to the index or by fully rebuilding the index, as selected.

According to another aspect of the present invention, there is provided the above method in which the function comprises the step of determining, for each potential binary tree height of the index, a threshold percentage of the table size of the second set of data to the table size of the first set of data, whereby the threshold percentage value for each binary tree height determines the selection of the incremental index update or the full rebuild index update.

According to another aspect of the present invention, there is provided the above method further comprising the step of a user specifying the selection of the incremental update of the index, the full rebuild of the index, or the selection based on the heuristic determination function.

According to another aspect of the present invention, there is provided a computer program product tangibly embodying a program of instructions executable by a computer to perform the above method steps.

Advantages of the present invention include improvements in the efficiency in updating a database when loading data or when rolling forward data after a database restore.

BRIEF DESCRIPTION OF THE DRAWINGS

The preferred embodiment of the invention is shown in the drawings, wherein.

DETAILED DESCRIPTION OF THE PREFERRED EMBODIMENT

Figure 1:
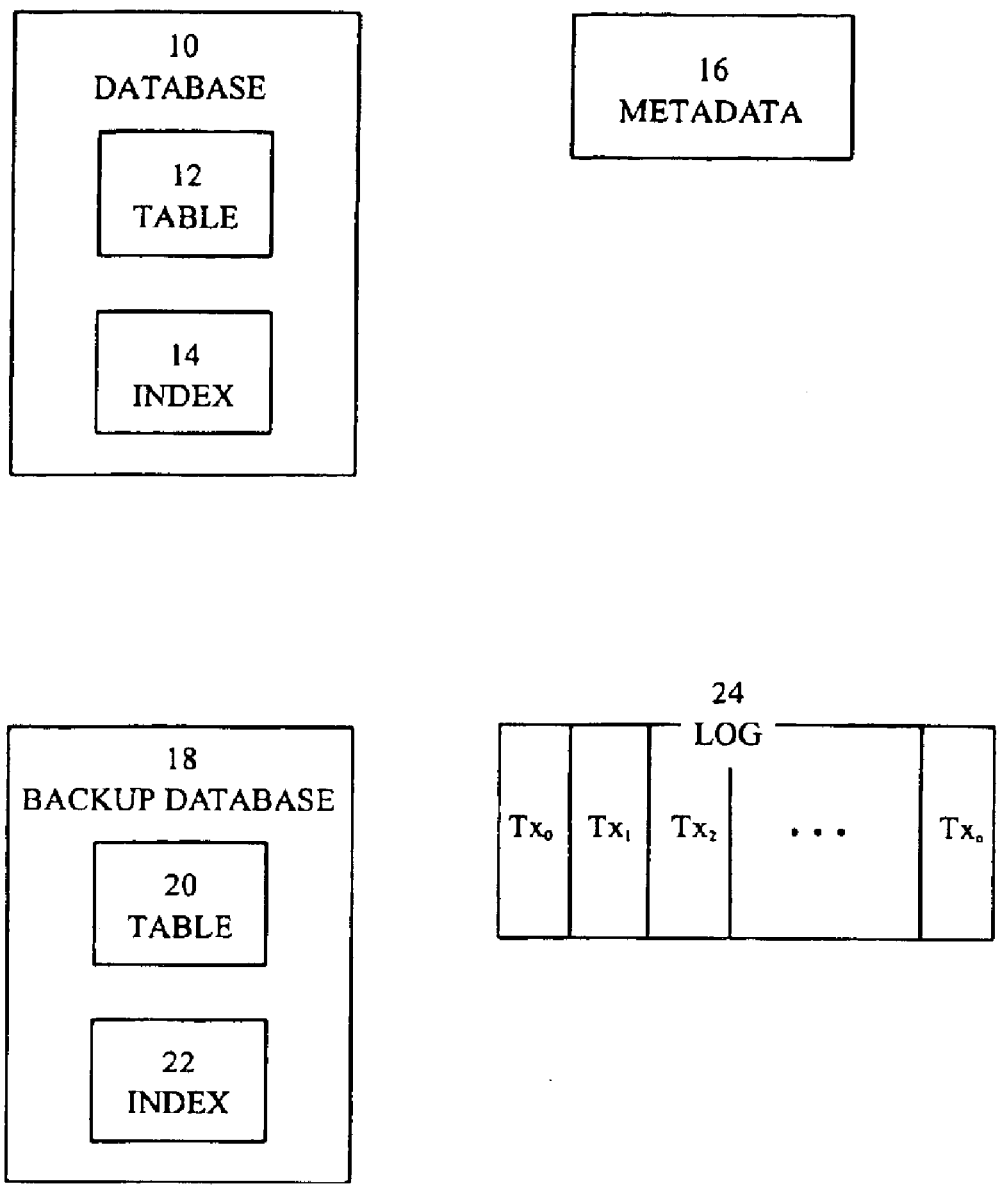
FIG. 1 is a block diagram showing the data structures used by the preferred embodiment in a data roll forward.

The preferred embodiment is described with reference to the DB2 database management system (DBMS).** Those skilled in the art will appreciate that the preferred embodiment may be implemented in other DBMS environments other than DB2. The preferred embodiment of the invention relies on the fact that for some database operations a series of transactions will result in data being updated without there being a need to access indexes associated with the data.

**DB2 is a registered trademark of International Business Machines Corp.

For example, a DBMS may permit a user to load data into a table in the database from another source (for example where data is copied from a first database into a second database). The DB2 LOAD command is an example of this sort of operation. The LOAD command will result in data being inserted into a table. It is possible for large data collections to be added to tables using the LOAD command. In one type of prior art system, the DBMS will incrementally update indexes associated with the table into which data is placed using the LOAD command. In such a system, the index on the table will be modified on a record by record basis to reflect the new records added to the table by the LOAD command. However, the index will not be used, in the sense of being accessed to locate data in the database, until the LOAD command has been completed and all the data has been added to the target table in the database. In other systems, the index will not be updated in an incremental fashion but will be fully rebuilt following the addition of new records to the data in the database.

Another example of where a DBMS adds to or modifies data without the use of an index until the changes to the data are complete is in the ROLLFORWARD command in DB2. When data in a relational database is recovered by using the RESTORE and ROLLFORWARD commands, the DBMS facilitates the rebuilding of a database from a transaction log where the database has been destroyed or become corrupted in some manner (a database "roll forward"). During the roll forward process, the data in the database is modified to reflect the transactions stored in the transaction log. In the prior art, it is common to update associated indexes on a record by record basis which reflects the transactions stored in the transaction log. For DBMS environments such as the DB2 system, the transaction log stores a portion of the transactional history which permits the updating of the data in the database after a database restore, without requiring reference to the indexes associated with the data being updated or rolled forward. The indexes associated with the data must be brought up to date at the end of the roll forward operation, but need not be synchronized with the data during the operation.

As indicated above, for certain DBMS environments, the DBMS will update indexes on a transaction by transaction or record by record basis. For certain DBMS environments, the content of the indexes during the data updating process (during the LOAD or the roll forward command execution) is not accessed by the DBMS. The DBMS requires a correct set of indexes at the completion of the operations but is not concerned with the intermediate values of the indexes.

As the above indicates, in the prior art, one approach in loading data or performing a roll forward on a database, is to update the database on a record by record basis. In such a system any indexes which are associated with the data being updated will also be modified on a record by record basis. Alternatively, certain DBMS designs will permit indexes to be rebuilt at the end of a roll forward operation. In certain DBMS designs, it is also possible for the system itself to select an index rebuild in certain circumstances where otherwise a record by record or incremental update of the index would occur. In the DB2 DBMS, for example, the default approach during the ROLLFORWARD command execution is the incremental updating of the index. The index rebuilding operation is only carried out where one of the transactions being replayed in a roll forward is an index create function. Otherwise, the entire set of transactions is replayed on the index.

Where data is loaded or a database is subject to a roll forward operation, it is possible that a significant proportion of the processing time for the operation will be taken up by the addition to or modification of the indexes associated with the data. In fact, for certain databases it may be more efficient to ignore the incremental updating of the associated indexes and to fully rebuild the indexes at the completion of the loading of data or the roll forward operations.

Turning to FIG. 1, an example database 10 is illustrated. Database 10 contains table 12 and index 14. For the purposes of the description of the preferred embodiment a relational database is described. It will be apparent to those skilled in the art that other database systems may be used to implement the preferred embodiment, with the appropriate changes to accommodate differences from the relational database model. In the preferred embodiment, there is a collection of meta-data shown in FIG. 1 as meta-data 16.

In the preferred embodiment, a backup of the database is made at periodic or user-defined intervals. In FIG. 1, backup database 18 is shown with table 20 and index 22. Backup database 18 represents stored data for database 10. In the system of the preferred embodiment, there is also a set of transactions stored in log 24. The stored transactions are shown as the set $Tx_0, Tx_1, Tx_2, \ldots Tx_n$. In the preferred embodiment, the set of transactions stored in log 24 are used by the system in conjunction with backup database 18 to recover data which may have been lost or inadvertently deleted. In the system of the preferred embodiment, the database 10 may be replaced with the data from backup database 18 (using the RESTORE command in the DB2 DBMS, for example). Log 24 contains transactions which have occurred since the time that backup database 18 was created. The stored transactions in log 24 are able to be replayed on recovered data in database 10, to update table 12 and index 14 in database 10. One prior art approach is to update index 14 as each transaction in log 24 is replayed on the data in database 10. Index 14 is therefore updated on a record by record (or transaction by transaction, basis). This is the approach used by the roll forward command available in the DB2 DBMS.

According to the preferred embodiment, the DBMS includes functionality to recover data using commands such as RESTORE and ROLLFOWARD, which does not necessarily require the record by record updating of index 14. In the preferred embodiment, backup database 18 may be used to replace the table 12 in database 10. However, when the transactions in log 24 are replayed on database 10 as in a roll forward, the system of the preferred embodiment will selectively permit table 12 to be updated, without updating index 14 (as is set out above, log 24 contains data for each of the stored transactions to permit updating of table 12 without reference to index 14). As the time for incrementally updating index 14 is potentially long, the savings in updating table 12, only are potentially significant. Once table 12 has been updated by the transactions in log 24, index 14 will be recreated by being rebuilt on the newly updated table 12.

Such a method of updating by ignoring index 14 until the completion of updating table 12 (the full index rebuild) is available in the preferred embodiment by user selection. Alternatively, the full index rebuild roll forward is available by the system of the preferred embodiment applying a heuristic determination function to meta-data 16.

Index meta-data 16 is represented as $S_i$. A heuristic determination function $F(S_i)$ is defined in the system of the preferred embodiment to accept the set of heuristic information and to determine whether indexing in a roll forward should be maintained transactionally (incremental updating), or deferred for a single recreation pass (full index rebuild).

The determination function $F(S_i)$ may accept as parameters such database meta-data as the estimated number of key-parts assumed to comprise an index at the time roll forward processing starts, and an estimate of the number of keypart updates that will be applied during roll forward processing. The specific decision making logic of the heuristic determination function $F(S_i)$ may be dependent on implementation details, for specific DBMS systems. The $F(S_i)$ definition may have considerable empirical dependence, which may vary between products, and between product releases.

A simple implementation of function $F(S_i)$ has parameters reflecting characteristics of an index 22, and compares these to a set of index characteristics at roll forward completion time which have been maintained in meta-data 16. In the specific implementation for the DB2 Universal Database, the preferred embodiment stores the number of index key operations as meta-data inside the index object meta-index. This information is periodically reflected in the database recovery history file during normal transaction processing of the DBMS. In the preferred embodiment this information is stored outside the database to maintain the information should the database crash. During roll forward recovery processing the desired heuristic information reflecting end-of-logs can be retrieved from the Recovery History File, and provided to the heuristic determination function $F(S_i)$.

Figure 2:
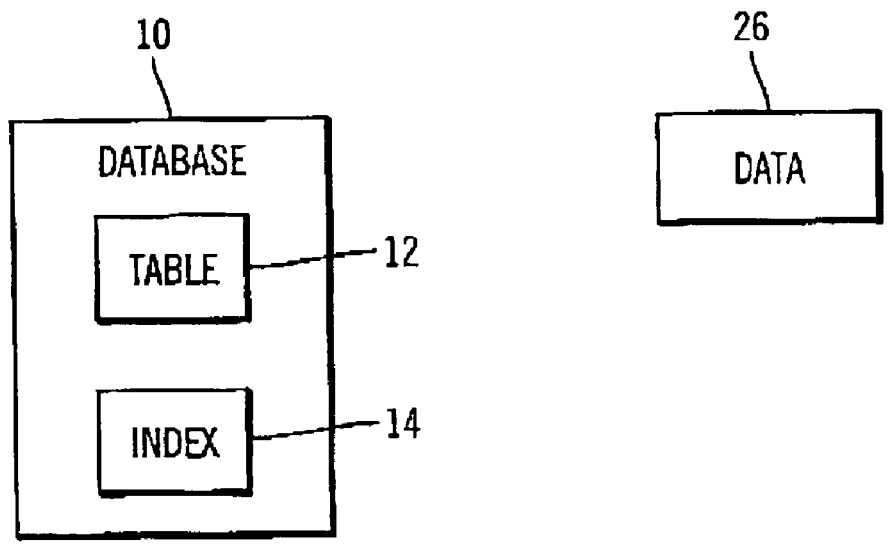
FIG. 2 is a block diagram showing the data structures used by the preferred embodiment prior to data being loaded into a database in the preferred embodiment.

In the system of the preferred embodiment, the heuristic determination function $F(S_i)$ is used also when pre-existing data is loaded into a database. FIG. 2 shows database 10 with table 12 and index 14. Data 26 is data to be added to database 10. In DBMS systems such as DB2, commands for loading data such as data 26 into database 10 are typically available (the LOAD command in DB2). In the system of the preferred embodiment, the data may be loaded such that index 14 is incrementally updated, or the data may be added to table 12 in database 10 without incrementally updating index 14. At the end of adding data 26 to table 12, index 14 may then be recreated using the updated data in table 12.

Figure 3:
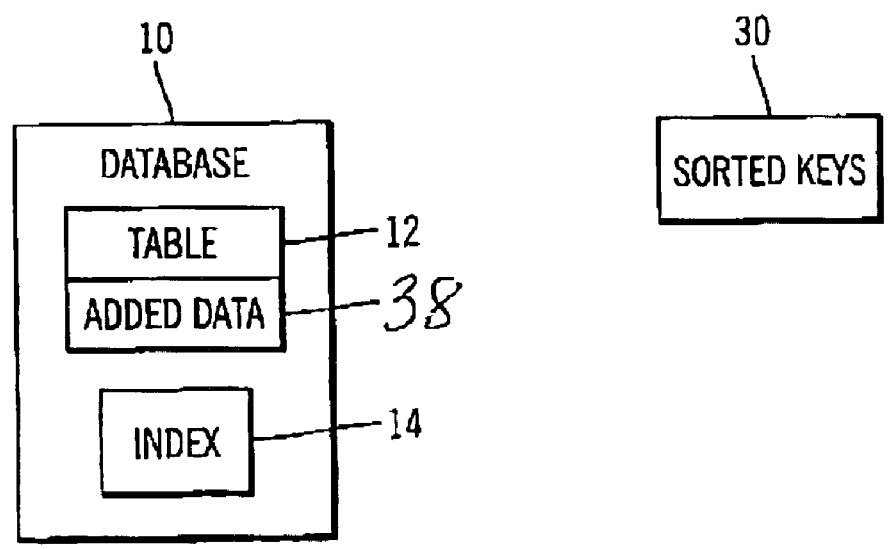
FIG. 3 is a block diagram showing the data structures used by the preferred embodiment during data being loaded into a database in the preferred embodiment.

The implementation of the loading of data in the preferred embodiment system may be described with reference to FIG. 3. The first step in loading data 26 is the addition of the data to table 12. The added data 38 shown in table 12 in FIG. 3, is added from data 26 (shown in FIG. 2). The system of the preferred embodiment also creates a data structure to hold the sorted keys 30 for added data 38. The sorted keys 30 relate to the keys in index 14. If the user or the heuristic determination function F(Si) selects an incremental update of index 14, then sorted keys 30 are added to index 14, on a key value by key value basis. Alternatively, if the user or function $F(S_i)$ determines that index 14 should be recreated, then index 14 will be rebuilt on the entire table 12 key values.

Figure 4:
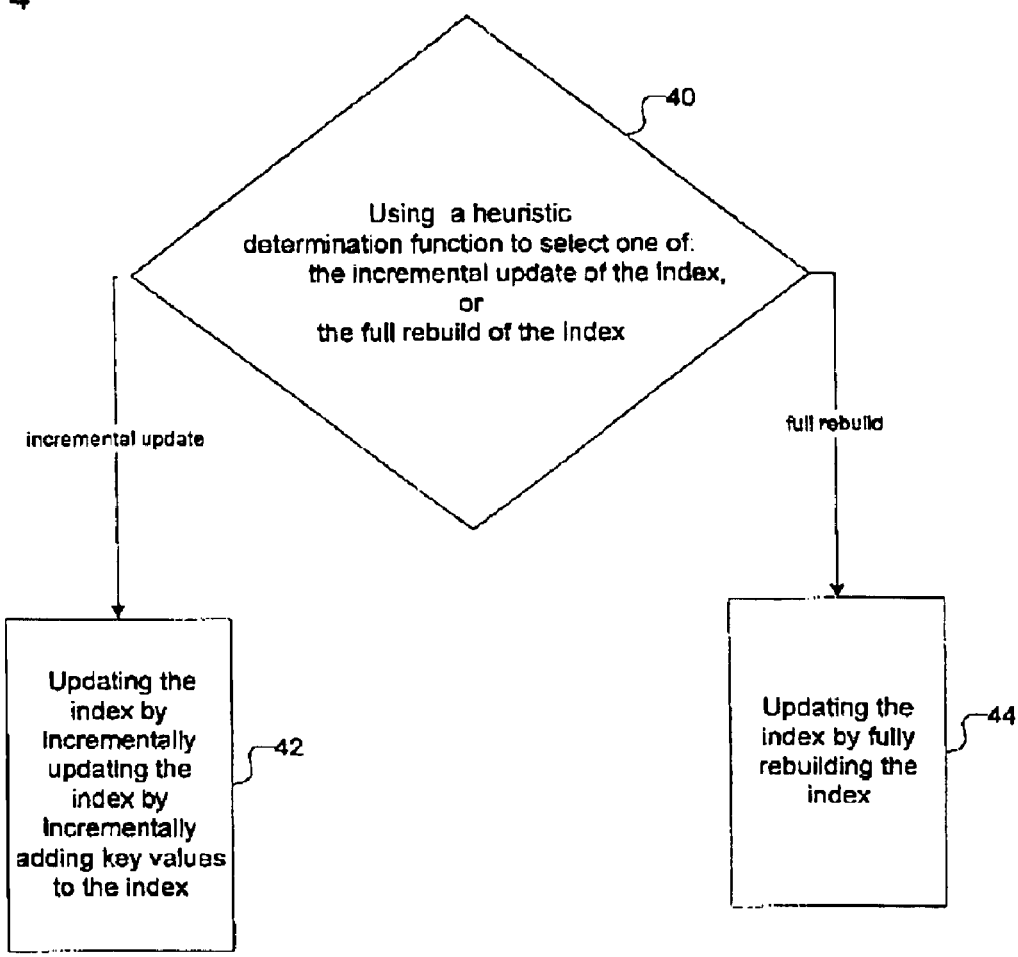
FIG. 4 illustrates operations, in accordance with certain embodiments.

As is apparent, in both the data recovery and roll forward operations, and in the data load operation, the use of the heuristic determination function $F(S_i)$ is available in the system of the preferred embodiment. The function will be used (FIG. 4: reference numeral: 38. 40. 42. 44) to select (FIG. 4: reference numeral 40) incremental updating (FIG. 4: reference numeral 42) index 14, or alternatively to select a full rebuilding (FIG. 4: reference numeral 44) of index 14. In the system of the preferred embodiment, the user may either manually select incremental or full rebuilding modes or may system option to have the system itself use the heuristic determination function $F(S_i)$ to make the selection.

In both the load and restore/roll forward operations, the heuristic determination function $F(S_i)$ is intended to predict which of the two index updating approaches (incremental and full rebuild) will be most efficient for the database updating which is being performed. The case where database 10 is relatively large, and few data values are added to database 10 (and correspondingly to index 14), will be, for many DBMS environments, one where incremental updating of index 14 will be more efficient. Conversely, where database 10 is relatively small and the data to be added by either a large log 24 or a large set of data 26, in many DBMS environments, it will be more efficient to update index 14 by fully rebuilding the index after table 12 has been updated. Typically, it is the database subsystem and environment which will determine which of the two different updating methods is more efficient, for a given data and index updating operation. The heuristic determination function $F(S_i)$ is intended to predict which of the two methods is more efficient, given a particular combination of existing database, update data, database subsystem and environment. Once the appropriate values for the function are set for a given database subsystem and environment, it is intended that the same function $F(S_i)$ will be appropriate for different table and index combinations in different database definitions.

In the system of the preferred embodiment, index 14 is stored in the form of a binary tree, such as a B-tree, B+-tree, or B*-tree. It is to be understood, however, that other index structures may be used and the benefit of the invention achieved. The preferred embodiment uses two characteristics of a binary tree index to model the efficiency of incremental updating and full rebuilding for an index. The two characteristics are the percentage of new data that is to be added to table 12 and the height of the binary tree structure of index 14. The tree height of index 14 is a measure of the size and complexity of index 14. In the example of the preferred embodiment, there is a single index shown. In the system of the preferred embodiment, the first table non-meta-index table index is taken to be representative of the database indexes which will be affected by the updating procedure. It will be understood by those skilled in the art that there may be other approaches to selecting an index which is representative of the indexes in a database for which data is to be updated. The approach of selecting the first such index and assuming that that index is representative has the advantage of carrying low storage and processing overheads. It may be advantageous in certain circumstances to maintain other data regarding the indexes such as the largest index, the smallest index, or the median or average index. Such approaches may require more system resources to maintain but will have the advantage of potentially providing better information about the structure of the indexes for the determination heuristic $F(S_i)$.

In defining $F(S_i)$ in terms of tree height of index 14, and the percentage of new data to be added to table 12, $F(S_i)$ is designed to reflect the time required to extract index keys from table 12. This operation is necessary in a full rebuild of index 14 and requires a scan of all records in table 12. The cost of this is generally linear with the size of the data on disk. Typically, each page must be scanned from disk, then scanned for records, and each record scanned for index keys.

The function $F(S_i)$ is also designed to reflect the time to sort index keys. This varies with the sorting algorithm used, the size of buffering for sort operations, and the cost of spilling to disk (if required). Generally, however, this cost is modelled as an NlogN operation.

The function is also intended to reflect the time to fully rebuild index 14 from a set of sorted keys. This is generally a linear operation, which varies with the number of key values to be included in index 14. Conversely, the function will be used to reflect the time to incrementally extend index 14 with a set of sorted keys. This is generally a non-linear operation, which is a function of the height of the binary index tree.

In the model for $F(S_i)$ of the preferred embodiment, a threshold value for percentage of new data is determined for different tree heights. The threshold value will indicate at what point it is estimated that incremental updating of index 14 is to be used (the threshold value and below) and at what point a full rebuild approach to index 14 should be used (above the threshold value).

In the preferred embodiment, the $F(S_i)$ is essentially a table:

| Tree Height | Threshold |
| --- | --- |
| 2 (or less) | T2 |
| 3 | T3 |
| 4 | T4 |
| 5 | T5 |
| 6 | T6 |
| 7 | T7 |
| 8 | T8 |

In the table T2 . . . T8 represent the percentile thresholds for the tree height 2 to 8 for which incremental indexing proves to yield superior performance for a given DBMS. As the tree height grows, incremental indexing threshold values will vary. The incremental costs of sorting data need to be balanced against the cost of traversing the tree. Since both sorting and scanning the binary tree vary as NlogN operations, to some extent the way these two factors trade off with varying amounts of new and old data depends on the implementation of the key sorting and tree insertion logic. Due to the dependency on implementation, the preferred embodiment models these costs empirically. Tests are performed to examine at what volumes of new index key values, incremental indexing performed better than full index rebuilding.

In the preferred embodiment, the $F(S_i)$ for the DB2 product was determined by using as benchmark data a set of data provided by the Transactional Processing Performance Counsel. Based on that benchmark data, the values for the thresholds for tree heights 2 to 8, inclusive, for the DB2 product were calculated as:

T2=16
T3=19
T4=21
T5=24
T6=27
T7=30
T8=33

Additional values may be calculated for tree heights greater than eight, as required. The above values indicate that where index 14 has a height 6, for example, and the data to be added to table 12 is above 27% of the size of table 12 (the number of records to be added is more than 27% of the number of records in table 12), then a full rebuild of index 12 will be more efficient than adding key values to index 12 incrementally. It is to be understood that the above values may vary for different DBMS environments and data sets.

Although the above table values for the function $F(S_i)$ were arrived at by taking test data and manually constructing indexes to determine the thresholds for the different heights of trees, such a process need not be carried out by a user. Once the location of the test data is indicated to the system of the preferred embodiment, it is possible for the system to run the tests to come up with the appropriate threshold values as part of the system set up. It is necessary for the system to clock its own processes and to select the appropriate threshold points based on the data provided.

For indexes such as hash indexes which are not based on a binary tree structure, the heuristic determination function may compare percentages of new data to total data volume to achieve a heuristic to predict when incremental or full rebuild approaches are more efficient.

Other characteristics of database 10 which may be included in determining the function $F(S_i)$ include:

1. The percentage of freespace in index 14;
2. The estimated size of index 14 after either incremental or full rebuild updates (a fill rebuild will often reduce fragmentation);
3. The width of the average index key;
4. The size of the sort heap and the database bufferpool (for memory caching);
5. The number and speed of the CPUs in the system; and
6. The number and speed of disks in the system.

Each of the above characteristics may have an impact on the relative efficiency of incremental and full rebuild updating of index 14. For that reason, inclusion of these values in the function $F(S_i)$ may provide additional predictive accuracy for the function.

Although a preferred embodiment of the present invention has been described here in detail, it will be appreciated by those skilled in the art, that variations may be made thereto, without departing from the spirit of the invention or the scope of the appended claims.

What is claimed is:

1. A method for updating an index on a database table when data is added to the table, comprising:
   receiving data records to load into the table;
   selecting one of a first operation and second operation, wherein the first operation incrementally updates the index on the table as each received data record is added to the table and the second operation rebuilds the index from the table after all the received data records have been added to the table; and
   using the selected first operation to incrementally update the index with the data from the received data records, and using the selected second operation to rebuild the index with the data from the received data records.

2. The method of claim 1, further comprising:
   determining which of the first operation or second operation is more efficient, wherein the first or second operation determined to be more efficient is the selected operation used for updating the index with the received data records.

3. The method of claim 2, wherein determining which operation is more efficient is a function of a percentage of the received data records to add to the table and characteristics of the index.

4. The method of claim 3, wherein the characteristics of the index used in determining which operation is more efficient comprise a size and complexity of the index.

5. The method of claim 4, wherein the index comprises a binary tree structure, and wherein a height of the index tree is indicative of the size and complexity of the index.

6. The method of claim 2, wherein determining which operation is more efficient further comprises considering at least one of a following factors: an estimated time required to extract index keys from the table; an estimated time to sort the index keys, and an estimated time to rebuild the index from the sorted keys.

7. The method of claim 2, further comprising:
   maintaining a list of threshold values for different index sizes; and
   using the number of received data records to add to the table to determine a comparison value, wherein determining whether the first or second operation is more efficient is based on the comparison value and the threshold for the size of the index to be updated.

8. the method of claim 7, wherein the comparison value comprises the number of the received data records as a percentage of all data records in the table.

9. The method of claim 8, wherein the index comprises a binary tree and wherein the list of threshold values provides one threshold for each of a plurality of different height index binary trees, wherein the threshold selected for comparison with the comparison value is based on the height of the index to update.

10. The method of claim 7, wherein the first operation is more efficient if the comparison value is less than the threshold value and wherein the second operation is more efficient if the comparison value is greater than the threshold value.

11. The method of claim 1, wherein selecting is performed by a heuristic determination function.

12. The method of claim 11, wherein the heuristic determination function allows a user to specify a selection between an incremental update of the index and a full rebuild of the index.

13. The method of claim 11, wherein the heuristic determination function takes as input index meta-data.

14. A system for updating an index on a database table when data is added to the table, comprising:
   a database system including the table and the index on the table;
   means for receiving data records to load into the table;
   means for selecting one of a first operation and second operation, wherein the first operation incrementally updates the index on the table as each received data record is added to the table and the second operation rebuilds the index from the table after all the received data records have been added to the table; and
   means for using the selected first operation to incrementally update the index with the data from the received data records and using the selected second operation to rebuild the index with the data from the received data records.

15. The system of claim 14, further comprising:
means for determining which of the first operation or second operation is more efficient, wherein the first or second operation determined to be more efficient is selected to use for updating the index with the received data records.

16. The system of claim 15, wherein the means for determining which operation is more efficient is a function of a percentage of the received data records to add to the table and characteristics of the index.

17. The system of claim 16, wherein the characteristics of the index used in determining which operation is more efficient comprise a size and complexity of the index.

18. The system of claim 17, wherein the index comprises a binary tree structure, and wherein a height of the index tree is indicative of the size and complexity of the index.

19. The system of claim 15, wherein the means for determining which operation is more efficient further comprises considering at least one of a following factors; an estimated time required to extract index keys from the table; an estimated time to sort the index keys; and an estimated time to rebuild the index from the sorted keys.

20. The system of claim 15, further comprising:
means for maintaining a list of threshold values for different index sizes; and
means for using the number of received data records to add to the table to determine a comparison value, wherein determining whether the first or second operation is more efficient is based on the comparison value and the threshold for the size of the index to be updated.

21. The system of claim 20, wherein the comparison value comprises the number of the received data records as a percentage of all data records in the table.

22. The system of claim 21, wherein the index comprises a binary tree and wherein the list of threshold values provides one threshold for each of a plurality of different height index binary trees, wherein the threshold selected for comparison with the comparison value is based on the height of the index to update.

23. The system of claim 20, wherein the first operation is more efficient if the comparison value is less than the threshold value and wherein the second operation is more efficient if the comparison value is greater than the threshold value.

24. The system of claim 14, wherein the means for selecting comprises a heuristic determination function.

25. The system of claim 24, wherein the heuristic determination function allows a user to specify a selection between an incremental update of the index and a full rebuild of the index.

26. The system of claim 24, wherein the heuristic determination function takes as input index meta-data.

27. A program for updating an index on a database table when data is added to the table, wherein the program is embedded in a computer readable medium and capable of causing a computer to perform:
receiving data records to load into the table;
selecting one of a first operation and second operation, wherein the first operation incrementally updates the index on the table as each received data record is added to the table and the second operation rebuilds the index from the table after all the received data records have been added to the table; and
using the selected first operation to incrementally update the index with the data from the received data records and using the selected second operation to rebuild the index with the data from the received data records.

28. The program of claim 27, wherein the program is further capable of causing the processor to perform:
determining which of the first operation or second operation is more efficient, wherein the first or second operation determined to be more efficient is selected to use for updating the index with the received data records.

29. The program of claim 28, wherein determining which operation is more efficient is a function of a percentage of the received data records to add to the table and characteristics of the index.

30. The program of claim 29, wherein the characteristics of the index used in determining which operation is more efficient comprise a size and complexity of the index.

31. The program of claim 30, wherein the index comprises a binary tree structure, and wherein a height of the index tree is indicative of the size and complexity of the index.

32. The program of claim 29, wherein determining which operation is more efficient further comprises considering at least one of a following factors: an estimated time required to extract index keys from the table; an estimated time to sort the index keys; and an estimated time to rebuild the index from the sorted keys.

33. The program of claim 29, wherein the program is further capable of causing the processor to perform:
maintaining a list of threshold values for different index sizes; and
using the number of received data records to add to the table to determine a comparison value, wherein determining whether the first or second operation is more efficient is based on the comparison value and the threshold for the size of the index to be updated.

34. The program of claim 33, wherein the comparison value comprises the number of the received data records as a percentage of all data records in the table.

35. The program of claim 34, wherein the index comprises a binary tree and wherein the list of threshold values provides one threshold for each of a plurality of different height index binary trees, wherein the threshold selected for comparison with the comparison value is based on the height of the index to update.

36. The program of claim 33, wherein the first operation is more efficient if the comparison value is less than the threshold value and wherein the second operation is more efficient if the comparison value is greater than the threshold value.

37. The program of claim 27, wherein selecting is performed by a heuristic determination function.

38. The program of claim 37, wherein the heuristic determination function allows a user to specify a selection between an incremental update of the index and a full rebuild of the index.

39. The program of claim 37, wherein the heuristic determination function takes as input index meta-data.

* * * * *